(12) United States Patent
Yudintsev

(10) Patent No.: US 9,550,118 B2
(45) Date of Patent: Jan. 24, 2017

(54) METHOD FOR SIMULATING VIDEO GAMES ON MOBILE DEVICE

(71) Applicant: Gaijin Entertainment Corporation, Alexandria, VA (US)

(72) Inventor: Kirill Yudintsev, Moscow (RU)

(73) Assignee: Gaijin Entertainment Corp., Alexandria, VA (US)

(*) Notice: Subject to any disclaimer, the term of this patent is extended or adjusted under 35 U.S.C. 154(b) by 604 days.

(21) Appl. No.: 14/078,756

(22) Filed: Nov. 13, 2013

(65) Prior Publication Data

US 2015/0133218 A1    May 14, 2015

(51) Int. Cl.
*A63F 13/335* (2014.01)
*A63F 13/355* (2014.01)
*A63F 13/92* (2014.01)

(52) U.S. Cl.
CPC ............ *A63F 13/335* (2014.09); *A63F 13/355* (2014.09); *A63F 13/92* (2014.09)

(58) Field of Classification Search
CPC .................................................. A63F 2300/538
See application file for complete search history.

(56) References Cited

U.S. PATENT DOCUMENTS

| | | | | |
|---|---|---|---|---|
| 2008/0300061 A1* | 12/2008 | Zheng | ................... | A63F 13/10 463/42 |
| 2010/0138780 A1* | 6/2010 | Marano | ................. | G06F 3/1415 715/804 |
| 2011/0066971 A1* | 3/2011 | Forutanpour | ......... | G06F 9/4443 715/788 |
| 2013/0205206 A1* | 8/2013 | Hawver | ................. | G06F 9/485 715/704 |
| 2014/0274384 A1* | 9/2014 | Boswell | ............... | A63F 13/355 463/31 |

* cited by examiner

*Primary Examiner* — Jasson Yoo
(74) *Attorney, Agent, or Firm* — Bardmesser Law Group

(57) ABSTRACT

A system and method for providing players with real-time information on any device capable of running a web browser is provided. The system solves the problem of game interface overloads and also brings the following benefits: provides for control optimization and for more options for a team game play. A usual game play experience is completely simulated on any remote mobile device by allowing remote input of the game controls from the mobile device to the base platform (PC/MAC, etc) and streaming the video from the base platform to the mobile device. The mobile device acts as a "thin client" for the base platform. Adoption of the game to the mobile device is not required.

17 Claims, 6 Drawing Sheets

METHOD FOR SIMULATING VIDEO GAMES ON MOBILE DEVICE

BACKGROUND OF THE INVENTION

Field of the Invention

The present invention relates to video games and, in particular, to providing a web user interface for remote display of in-game information, receiving control inputs from auxiliary devices and providing web-based interactive editor of in-game maps, missions and other contents to facilitate creation of user-generated content, as well as for remote access of a game running on a host computer via a web browser on tablets, smartphones and other mobile devices.

Description of the Related Art

Currently, many popular video games experience interface overloads—too many windows are activated during the game, pop-up notifications appear often, chat windows open automatically, etc. All these events cause players to lose immersion into a game, and generally annoy the players. The windows provide game-related information and the players have to look at them from time to time to know what is happening in the game. Thus, switching the windows off is not a solution for dealing with the interface overload.

Typically, the players have to use hotkeys to open/close certain windows (i.e., for example, chat or tasks windows), which is inconvenient in an action game, where a fast reaction is required and, especially, inconvenient when playing with a joystick. The interface overloads are particularly critical because of lack of a desktop space. There are still many players with laptops or older PCs who have low, or at best mediocre, monitor resolution, which affects their gaming experience. Apart from that, keyboard and mouse controls are not well suited for playing realistic simulation games such as aircraft simulator or car racing. These problems have become especially critical in cross-platform games that support a mission editor or other built-in tools for user-generated content. A mission editor normally requires a lot of inputs from user, such as positioning buildings on a map, choosing day/time and weather, setting specific parameters (victory conditions, session length, level limitations and so on. Such an editor further increases the interface overload, especially for console platforms where a user's input capabilities are limited by the console's gamepad. This, therefore, requires a special interface solution.

The above-described problems are present in almost any action or simulation game, but often are not given much consideration by the game developers. In some instances these issues can be partially solved by a special user interface (UI) design. However, none of the existing solutions provide for a desired gaming experience.

Accordingly, a solution which provides players with real-time information on any device capable of running a web browser is desired. It is also desired to be able to play a game on a desktop device without seeing any extra windows, while the additional interface windows can be shown on auxiliary mobile device(s), such as smartphones, tables, etc.

SUMMARY OF THE INVENTION

The present invention provides a method, system and computer program product for providing a web user interface for distributing in-game entities such as interface windows or mission editor onto multiple devices, thus decreasing interface overload on the desktop and providing a better game experience for users. The invention can also be used for running the games on tablets and other devices, so as to substantially obviate one or several of the disadvantages of the related art.

In one aspect of the invention, a system and method for providing players with real-time information on any device capable of running a web browser is provided. The system solves the problem of game interface overloads by allowing to show any of (or some of) the interface windows or notifications on a screen of a mobile device instead of or at the same time as the user's desktop machine, such as various controls for the aircraft, chat, video of other players (i.e., of the actual person playing the game), events, logs, game options, parameters of the aircraft/tank/etc., parameters of other players' vehicles, etc. The exemplary embodiment also brings the following benefits: provides for control optimization and for more options for a team game play.

According to the exemplary embodiment, present invention allows transferring in-game entities, such as game mechanics data, controls and audiovisual stream from the game to a designated address in network, where it is readable by any device with HTML 5-supporting web browser or similar. It is also possible to receive control inputs from the web browser on the mobile device, thus allowing the user to work with an in-game mission editor or to use the mobile device for remote control inputs. Apart from this, a typical game play experience can be completely simulated on any remote mobile device by both allowing remote input of the game controls from the mobile device to the base platform (PC/Mac, etc) and streaming the video from the base platform to the mobile device. Note that control inputs can be visualized on the mobile device to increase immersion in the game, for example, in a flight simulator game controls can be visualized in a form of a pilot's cockpit with all the appropriate switches and buttons. Adoption of the game to the mobile device is not required. It is possible to specify which in-game entities' data should be transferred into the network and to the mobile device(s), thus providing the user with mobile gameplay options ranging from a simple showing in-game information to a browser-based mission editor and complete gameplay simulation on the mobile device.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
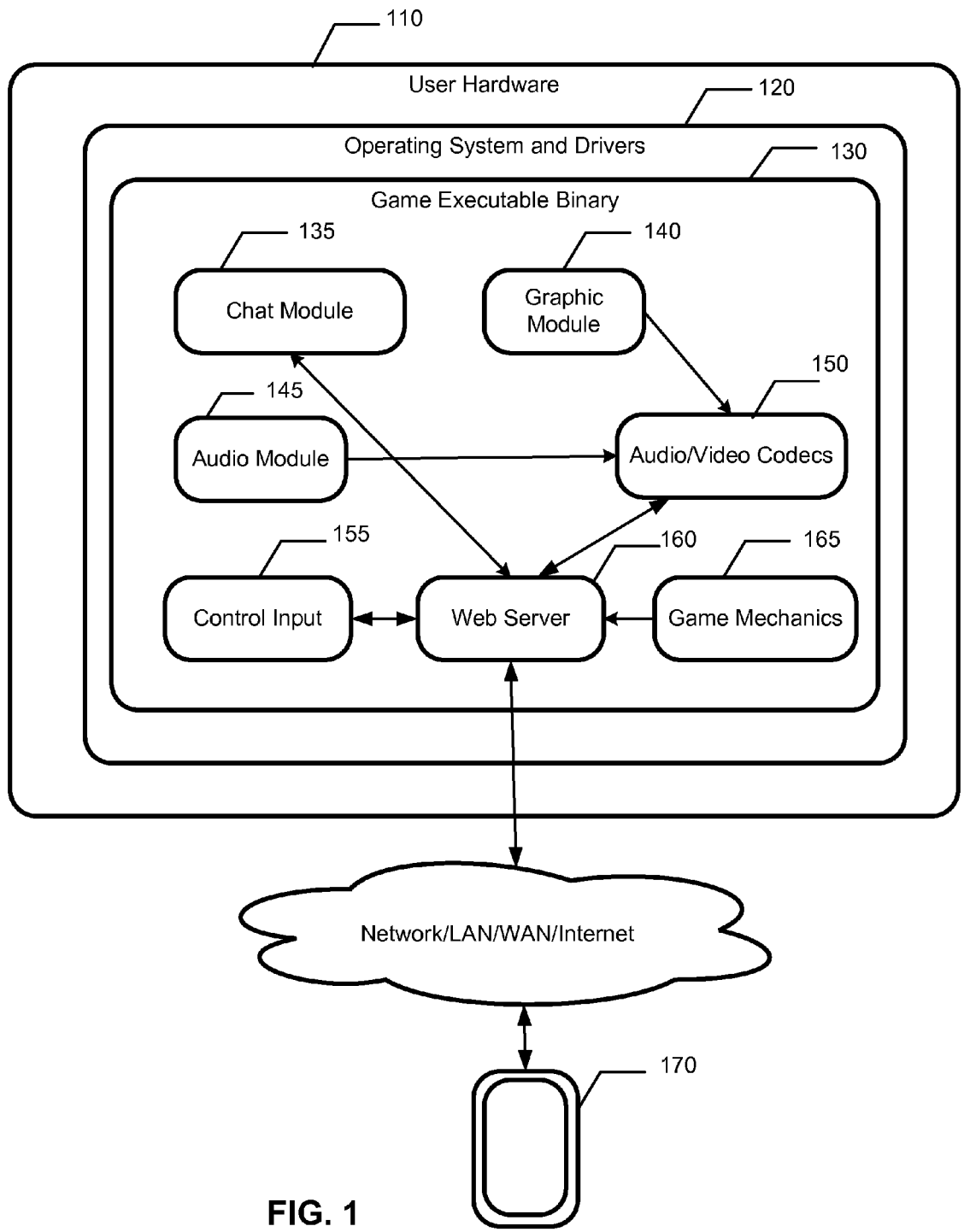
FIG. 1 illustrates system architecture, in accordance with the exemplary embodiment.

Reference will now be made in detail to the preferred embodiments of the present invention, examples of which are illustrated in the accompanying drawings.

According to an exemplary embodiment, a method, system and computer program product for solving interface overloads and implementing video games on mobile devices are provided.

In one aspect of the invention, a system providing players with real-time information on any device capable of running a web browser is provided. The system can also solve the problem of game interface overloads on the base system by transferring interface elements (e.g., interface windows, chats, control elements of an airplane or tank or ship, buttons and switches, and so on) onto a mobile device. The exemplary embodiment also brings the following benefits:

Controls optimization—most of the players use a keyboard and a mouse to interact with an action or a simulation game. In a simulation game, the player usually needs to remember and use a large number of keys and switches. According to the exemplary embodiment, the controls are simulated on iPad or other similar device, turning it into a virtual cockpit, where all necessary functions can be bound to standard tap or swipe gestures, thus making a simulator game session a lot more casual. The iPad turns into a gamepad for the PC game. Note that additional hardware, such as a joystick, is not required. Thus, while no additional hardware is used, a better immersion into the game is achieved. It is easier for a player to imagine himself being a pilot while tapping on an iPad dashboard rather than on a PC keyboard.

The exemplary embodiment provides for more options for team game play, especially with regards to those players who prefer to play in an Internet café. The information on every player's location, state of his vehicle, how much fuel he has left, etc. can be made available to the entire team, thus allowing them to allocate their forces better and generally have a better strategy in the game. The following game-related data can be transmitted within the game:

a map with friends/enemies locations and movements;
a chat data;
system events;
current tasks;
a dashboard, which shows any of:
  a speedometer—two types (ground speed, air speed);
  an altimeter;
  a compass;
  a gyroscopic horizon;
  G-meter;
  a clock;
  a manifold pressure;
  an oil pressure;
  an oil temperature;
  an engine rpm;
  a water pressure;
  a water temperature;
  a carburetor temperature;
  an amount of fuel left;
  a fuel pressure;
  a fuel consumption;
  a throttle;
  ammo left;
  flaps indicator;
  gears indicator; and
  oxygen level;
devices:
  pedals;
  aileron switches;
  rudder;
  supercharger;
  propeller pitch; and
  weapons.

According to the exemplary embodiment, the elements of functionality of a game client are made available for access from a third device. The conventional online gaming systems may allow users to access some of the features from outside the main client (for example, some client-based online games have mini-games for Facebook, where a player can earn game currency; mobile chat/news apps for online games are also common). However, in these cases, the software interacts with the game provider's game server—i.e., the Facebook mini-game or chat/news connects to the game server to retrieve data from it and can be called an abbreviated version of the full-fledged game client. In present invention, some or all of the functions of the game client running on desktop or console can be made available for access through a mobile or portable device According to the exemplary embodiment, a standard game experience can be completely simulated on any remote device by allowing remote input of game controls from the mobile device to the base platform (PC/MAC, etc) and streaming the video from the base platform to the mobile device. In this case, the mobile device acts as a "thin client" for the base platform (while the desktop acts as a server vis-à-vis the mobile device). Gameplay information such as chat windows and popup notifications is transferred to the mobile device where it can either be available in a separate browser window or can be shown in an overlay.

According to the exemplary embodiment, a game executable binary file runs a web server and transmits in-game information and optionally game play audiovisual stream to a specific address in the local network (for example, http://localhost:8111). Note that technically no client software is launched—the browser remotely connects to the game client running on a PC/MAC or other platform. The exemplary embodiment has advantages over conventional cloud gaming platforms. These systems use Adobe Flash-based client (or a separate browser plug-in) used for streaming video, authorization and controls input via a browser window. The games need to be adapted to be run on these systems.

According to the exemplary embodiment, only the game and a browser are needed. No administration rights are required. The exemplary embodiment includes a video compression and streaming algorithm designed specifically for use with video games. This has advantages over conventional remote desktop systems that use system-level software requiring installation with system administrator rights. The aforementioned software need to be installed on both devices—the client and the server. The software captures keyboard/mouse inputs and transfers back sequence of images from the server computer. The system is mostly utilized for remote system control and operation. Such system is a poor fit for gaming and video streaming.

According to the exemplary embodiment, a browser runs Java script or similar, which retrieves data from the webserver in the game client and, also, receives streaming video and audio. Technically, no game binary code is run on the device connected to a PC with a game client. No third party software is required, apart from the game itself. This has advantages over virtualization solutions that run part of the program code on the client by virtualizing necessary server OS components on the client. Also, the virtualization solutions may contain a separate file system to store some of the data retrieved from the server for off-line usage.

The exemplary embodiment is independent of the system requirements. The gaming solution allows users to play on any device that has enough processing power to play a video. Tablets, low-end laptops and low-end PCs can be used as an auxiliary device for the game to reduce interface overload on the desktop or to remotely play the game running on desktop. A typical use case is a family with one powerful desktop and several devices such as netbooks or tablets. The game can be launched on a desktop and rolled down, so a parent can do some work while a child is playing a video game remotely on the same desktop. The "reverse" can also be implemented—the game is played on the desktop, while some or all of the in-game interface windows, such as chat, mission planning, vehicle controls, and so on, are distributed to the mobile devices/netbooks/tablets. The popups (or game widgets) can be used in two different ways. One is when only the windows from the game are transferred into the external device. The benefit of this implementation is that the main screen is reserved entirely for the game and not overloaded with the widgets. The other one is the full game play on the external device. The exemplary embodiment provides for complete portability. The game does not occupy the PC screen. The game client can be rolled down and other family members can utilize the PC for their needs.

FIG. 1 illustrates system architecture, in accordance with the exemplary embodiment. User hardware 110 can be PS4, MAC or PC. Also, the hardware 110 includes peripheral devices, such as keyboard, mouse, speakers or display. Operating system and drivers 120 are low-level software that act as an intermediate between game binary 130 and the user hardware 110. The game binary 130 is the game code running on the user hardware and interacting with its devices via OS and drivers. The game binary includes any of the following functions:

a chat module 135 allows users to send and receive text messages;

a graphic module 140 processes game graphics and handles their outputs;

an audio module 145 responsible for sound input and output in the game;

audio/video codecs 150—integrated software modules that compress and output game audio and video data;

controls input module 155 responsible for reading controls-related inputs from the user hardware 110 (e.g., from a keyboard, a mouse, a joystick or any other peripheral device);

a Web Server 160 broadcasts in-game data and audio-video stream to a certain address in the network (by default http:**localhost:8111 or another address defined by the user or the game provider). The Web Server 160 receives controls input from external devices;

a game mechanics module 165 responsible for AI, experience, damage calculation, in-game controls visualization (cockpit) and other calculations related to the game play.

According to the exemplary embodiment, the game mechanics module 165 translates game data (map, dashboard, etc.) from in-game format into web-readable format (e.g., HTML) and transmits it to the in-game web-server 160 for publishing. The in-game web server 160 transmits HTML data to a certain address in the network. The system receives compressed audio/video stream of game play from the codecs 150 and transmits it to the Web Server 160. The system receives control input from the third devices and passes it to the game mechanics module 165 for processing. The system receives chat data from the chat module 135 and transmits the chat inputs from the mobile device 170 into the chat module 135. Note that the chat window can be hidden on the mobile device or displayed in an overlay fashion.

Figure 2:
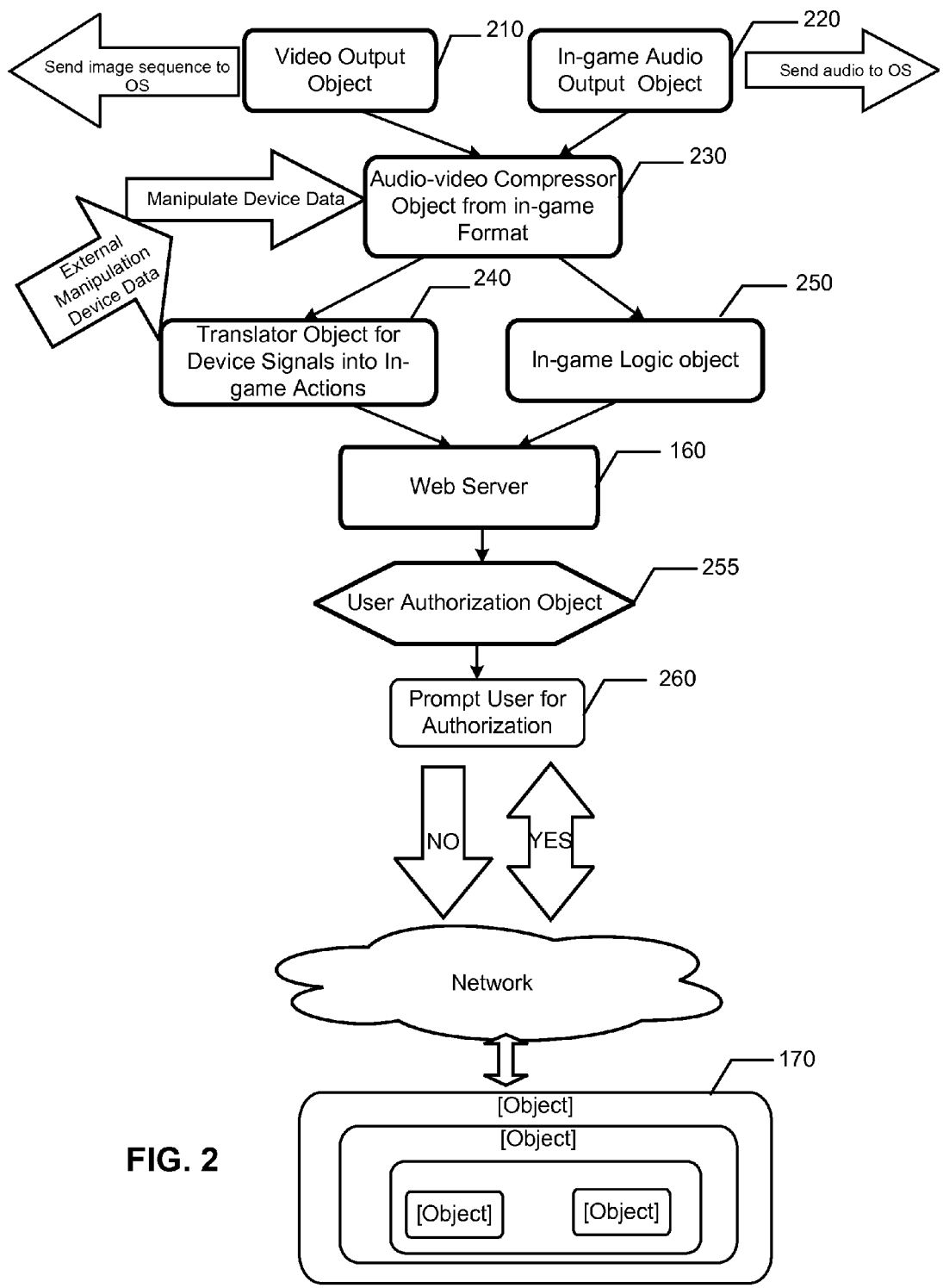
FIG. 2 illustrates a workflow between system objects, in accordance with the exemplary embodiment.

FIG. 2 illustrates a workflow between system objects, in accordance with the exemplary embodiment. A video output object 210 sends video to the OS. An in-game audio output object 220 sends the audio to the OS. The audio and video streams are provided to a compressor object 230, which compresses the data from the in-game format using one of the common audio/video compression algorithms, such as x264. The compressor object 230 sends data to a translator object 240, which translates the signals into in-game actions. The compressor object 230 also provides data to an in-game logic object 250. The game actions and the game logic are provided to a web server 160. The web server 160 runs scripts that visualize game data using HTML data, streaming game audio and video signals and inputs from external devices received by the compressor object 230. Note that audiovisual stream compression and control inputs are optional and require simple authorization from the user, such as a one-time password, while the stream of in-game data is always on and is accessible without authorization.

The web server 160 prompts the user for authorization 260 through a user authorization object 255. If the authorization is successful, a mobile device object 170 is authorized to have a full access to the game on host machine, including controls. Authorization is not required for accessing in-game information which is always transmitted by the webserver to the designated address in local network. The web server 160 can send game mechanics data and game audio/video streams to the mobile device object 170 and receive control inputs from mobile device object 170.

If the authorization is not successful, the mobile device object 170 is only granted a read-only access to in-game information transmitted by webserver. The web server 160 can send game mechanics data—map position, enemy position, vehicle condition, vehicle device data, etc. Note that the in-game webserver is not much different from other web server technologies, only simplified due to the limited amount of the tasks it needs to perform. The only requirement for the client side is to have a browser supporting HTML 5 technology or similar.

Figure 3:
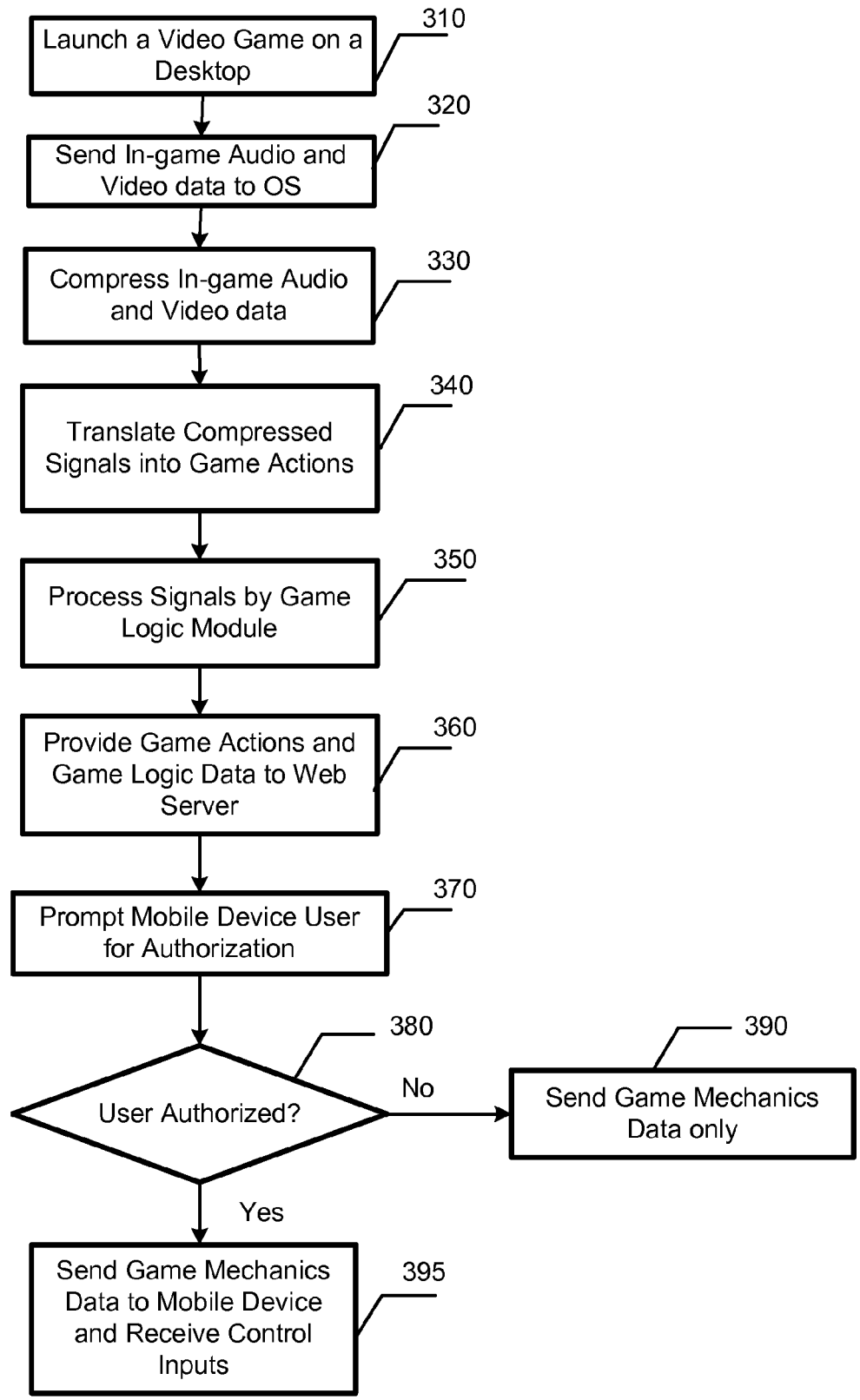
FIG. 3 illustrates a flow chart of a method for executing a desktop video game on a mobile device, in accordance with the exemplary embodiment.

FIG. 3 illustrates a flow chart of a method for executing a desktop video game on a mobile device, in accordance with the exemplary embodiment. In step 310, a video game is launched on a host desktop. An in-game audio and video data is sent to the OS in step 320. The audio and video data optionally may be compressed by a compressor module in step 330. Note that the audio and video data is compressed from the in-game format into a widely-used video streaming format such as MP4 or similar. The compressed signals are translated into game actions in step 340. In step 350, the translated signals are processed by the game logic module. The process provides the game logic data and game actions to the web server in step 360. The web server generates access code which is shown on host machine and prompts a mobile device user to input this code in step 370. If the user is successfully authorized by using this code in step 380, the web server sends the game mechanics data to the mobile device and receives control inputs (including the inputs from web-based mission editor) from the mobile device in step 395. Otherwise, the web server sends the game mechanics data to the mobile device, but does not receive the control input in step 390. According the exemplary embodiment, the mobile device gets the necessary data from the game. The additional windows can be hidden on the mobile device or they can be rendered on an overlay.

Figure 4:
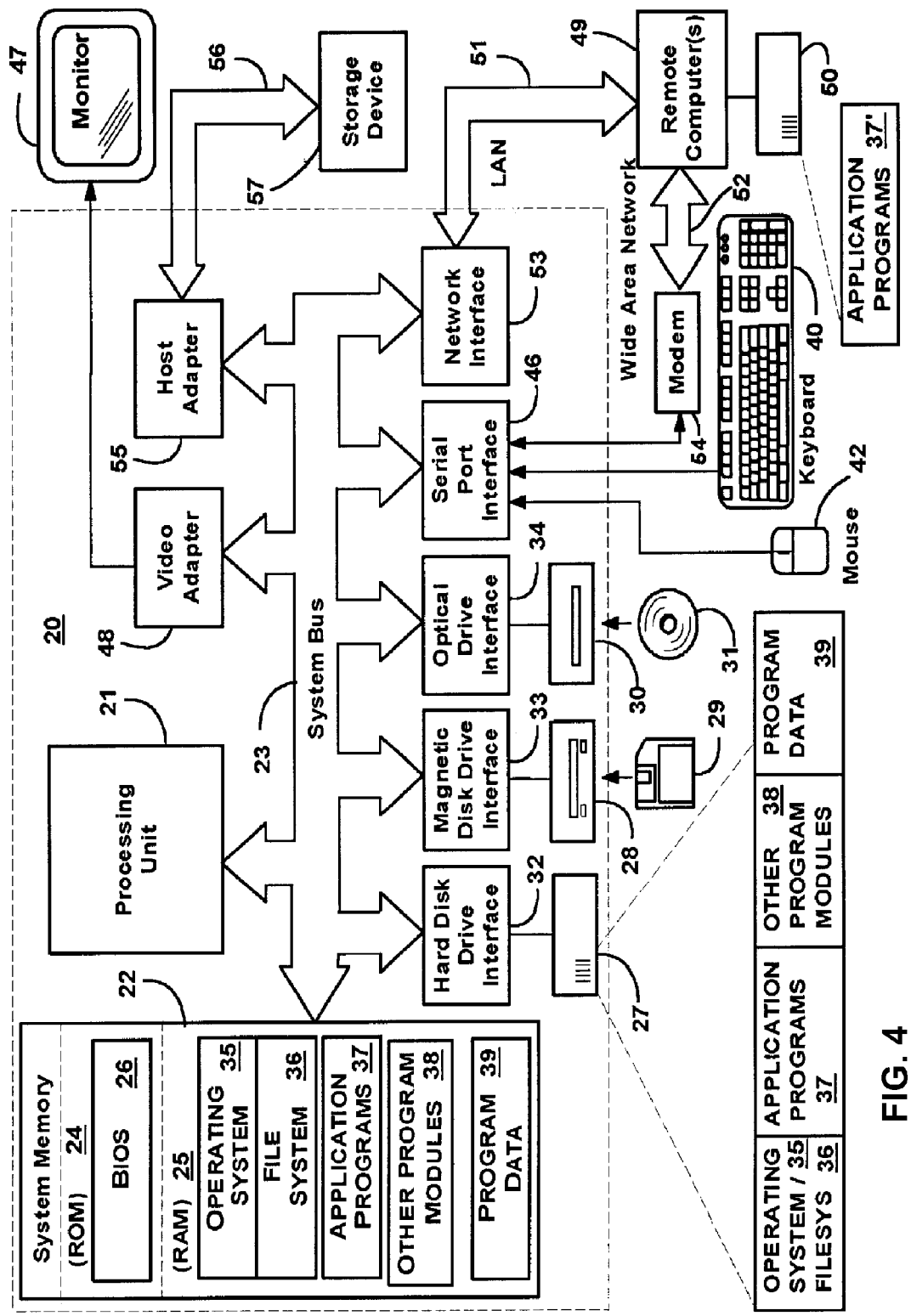
FIG. 4 illustrates a schematic of an exemplary computer system or a server that can be used for implementation of the invention.

With reference to FIG. 4, an exemplary system for implementing the invention includes a general purpose computing device in the form of a computer/server 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 180, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 180 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 5:
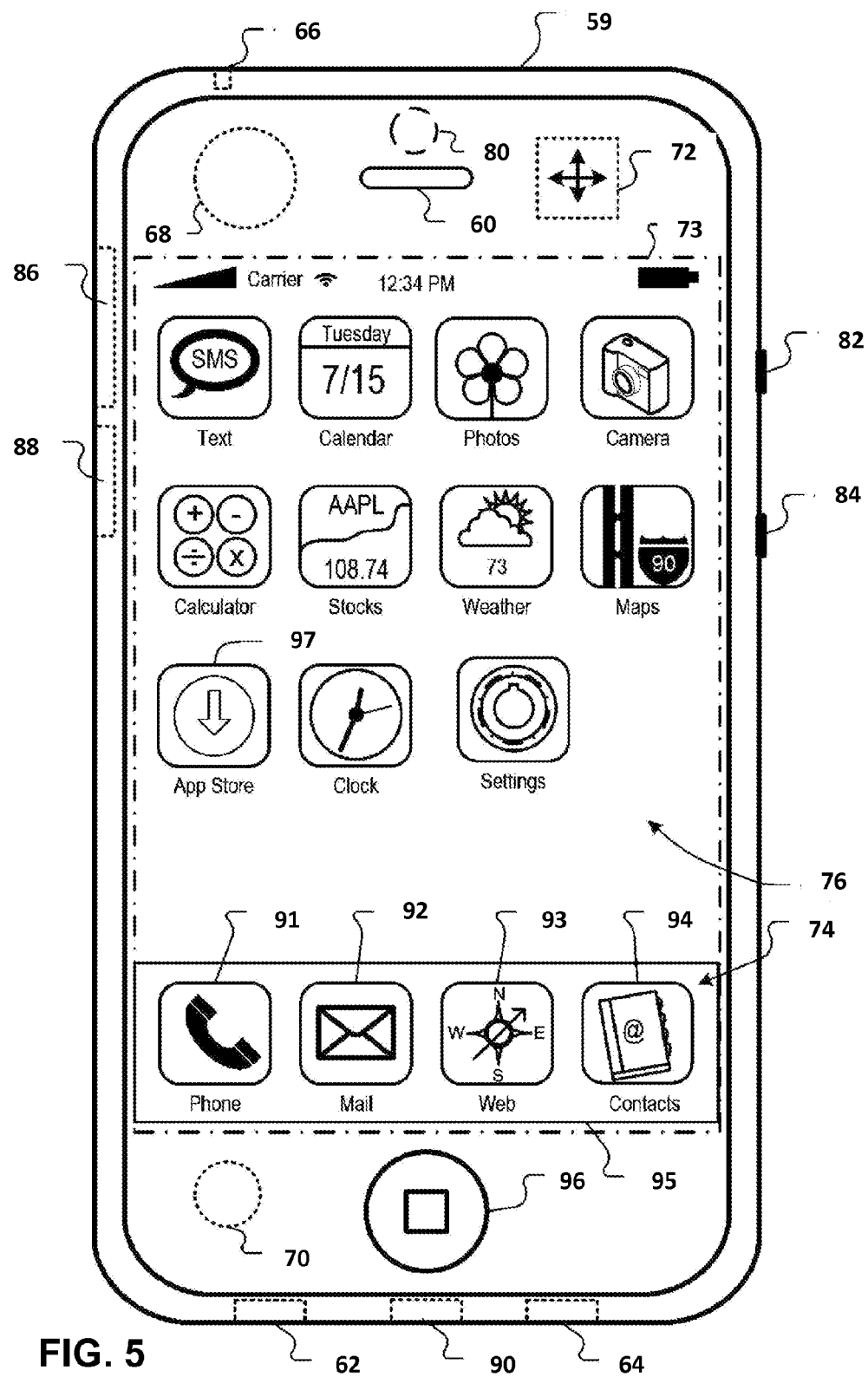
FIG. 5 is a block diagram of a mobile device on which the invention can be implemented.

FIG. 5 is a block diagram of a mobile device 59 on which the invention can be implemented. The mobile device 59 can be, for example, a personal digital assistant, a cellular telephone, a network appliance, a camera, a smart phone, a tablet, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to haptic and/or tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality.

For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, functionality of each corresponding device may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape.

In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video. The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

Figure 6:
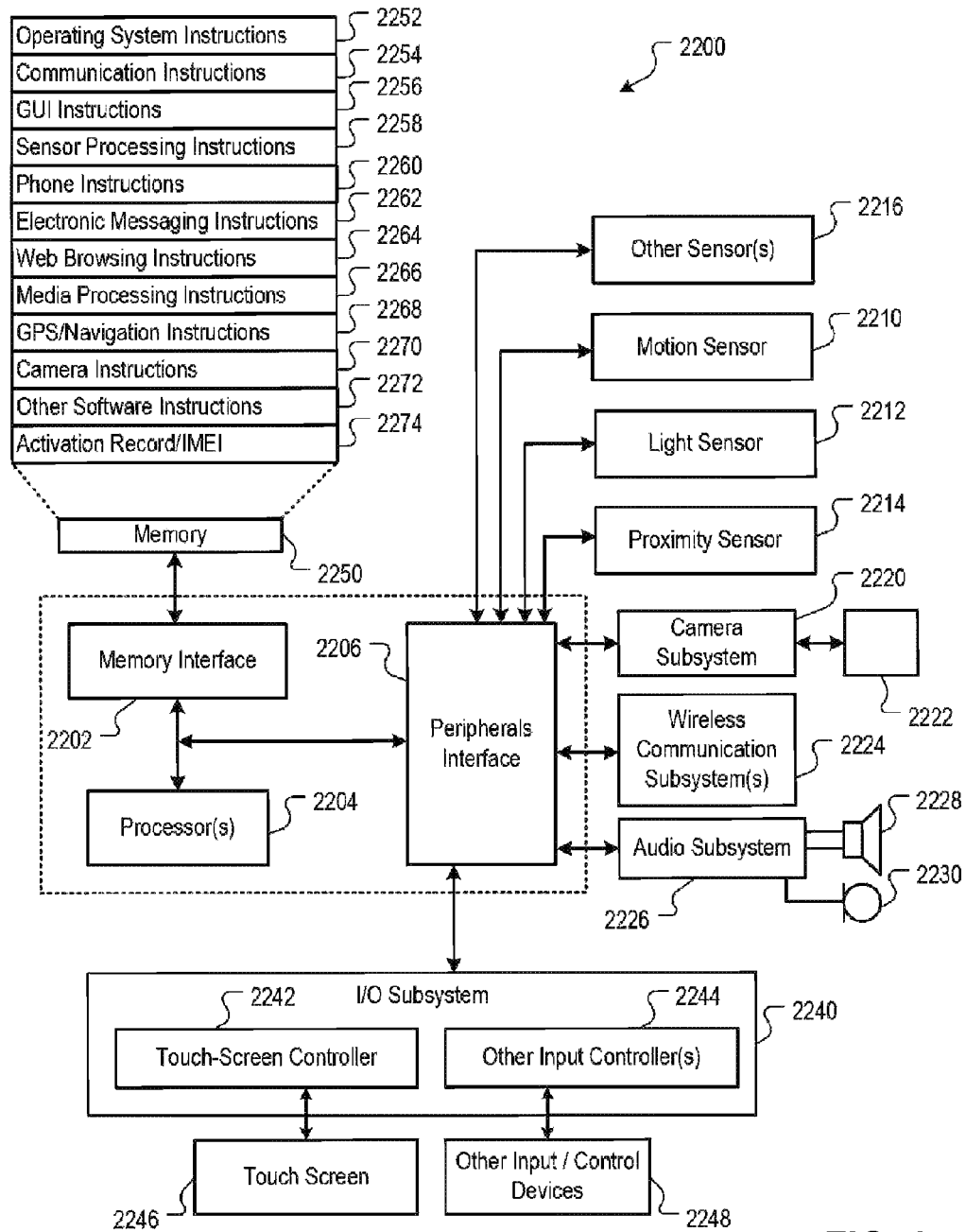
FIG. 6 is a block diagram of an exemplary implementation of the mobile device.

FIG. 6 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network (s) over which the mobile device 59 is intended to operate. For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions. The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

Having thus described a preferred embodiment, it should be apparent to those skilled in the art that certain advantages of the described method and apparatus have been achieved. In particular, those skilled in the art would appreciate that the proposed system and method provide for execution of a desktop video game on a remote mobile device.

It should also be appreciated that various modifications, adaptations and alternative embodiments thereof may be made within the scope and spirit of the present invention. The invention is further defined by the following claims.

What is claimed is:

1. A computer-implemented method for distributing video game entities between a host desktop and mobile devices, the method comprising:

launching a video game on the host desktop, wherein the game interface includes additional in-game interface windows;
sending an in-game audio and video data to a host operating system;
translating the controls input data into game actions;
processing the in-game audio and video data by a game logic module;
providing the in-game audio and video data and game logic data to a built-in web server running on the host desktop and integrated into the video game;
prompting a mobile device for an authorization to connect to the built-in web server;
sending game mechanics data to a local network address where it is readable by a browser, including browsers for mobile devices,
wherein the in-game audio and video data do not require authorization for access on the local network by the mobile device; and
receiving game control inputs from the mobile device, if the mobile device is authorized,
wherein the additional in-game interface windows shown on the host desktop are instead hidden or minimized on the host desktop and are displayed on the mobile device.

2. The method of claim 1, wherein an entire game process is transferred to the mobile device.

3. The method of claim 1, further comprising running HTML scripts by the web server to visualize game data.

4. The method of claim 1, wherein the in-game interface windows displayed on the mobile device are widgets while a main display of the video game is shown on the host desktop.

5. The method of claim 1, wherein the launching of a video game on a host desktop comprises executing a game binary file.

6. The method of claim 1, wherein the mobile device acts as a thin client for the built-in web server running on the host desktop.

7. The method of claim 1, wherein popups showing notifications from the built-in web server are displayed on the mobile device as an overlay.

8. The method of claim 1, further comprising compressing the in-game audio and video data.

9. The method of claim 1, wherein the game control inputs include swipes and taps on a touch screen of the mobile device.

10. The method of claim 1, wherein the game control inputs include a dashboard for control of an aircraft.

11. The method of claim 1, wherein the game control inputs include a virtual cockpit that is simulated on the mobile device while a main display of the video game is shown on the host desktop.

12. The method of claim 1, wherein a chat interface is displayed on the mobile device while a main display of the video game is shown on the host desktop.

13. The method of claim 1, wherein a map with locations of friends and/or enemies is displayed on the mobile device while a main display of the video game is shown on the host desktop.

14. The method of claim 1, wherein instrument data of an aircraft is displayed on the mobile device while a main display of the video game involving the aircraft is shown on the host desktop.

15. The method of claim 1, wherein the mobile device connects to the network using a one-time password.

16. A system for simulating a video game on a mobile device, the system comprising:
a processor;
a memory coupled to the processor;
a computer program logic stored in the memory and executed on the processor, the computer program logic is configured to implement the steps of:
launching a video game on the host desktop, wherein the game interface includes additional in-game interface windows;
sending an in-game audio and video data to a host operating system;
translating the controls input data into game actions;
processing the in-game audio and video data by a game logic module;
providing the in-game audio and video data and game logic data to a built-in web server running on the host desktop;
prompting a mobile device for an authorization to connect to the built-in web server;
sending game mechanics data to a local network address where it is readable by a browser, including browsers for mobile devices,
wherein the in-game audio and video data do not require authorization for access on the local network by the mobile device; and
receiving game control inputs from the mobile device, if the mobile device is authorized,
wherein the additional in-game interface windows shown on the host desktop are instead hidden or minimized on the host desktop and are displayed on the mobile device.

17. A system for distributing video game entities between a host desktop and mobile devices, the system comprising:
a host computer system having a game binary running on it;
peripheral hardware devices connected to the host computer system;
a host operating system (OS) having installed drivers, wherein the host OS and the installed drivers act as an intermediary between the game binary and the hardware devices;
wherein the game binary include any of the following in-game interfaces:
(i) a chat module configured to send and receive text messages;
(ii) a graphic module configured to process game graphics and handle game outputs;
(iii) an audio module responsible for sound input and output in the game;
(iv) audio and video codecs configured to compress and output game audio and video data; and
(v) a controls input module configured to read controls-related inputs from the hardware;
an integrated web server running on the host desktop as part of the game binary and configured to broadcast in-game data and audio-video stream to a pre-defined local address in a local network and to receive controls input from the mobile devices; and
a game mechanics module responsible for in-game controls visualization,
wherein the game mechanics data is sent to the local address where it is readable by a browser, including browsers for the mobile devices,
wherein the in-game data and audio-video stream do not require authorization for access on the local network by the mobile device, wherein the integrated web server prompts the mobile devices for authorization to connect to the integrated web server through the local network, and wherein the in-game interface windows are hidden on the host desktop and are instead displayed on the mobile devices.

\* \* \* \* \*